United States Patent [19]

Jelinek

[11] 4,254,960

[45] Mar. 10, 1981

[54] SEALING DEVICE

[75] Inventor: Jerry G. Jelinek, La Habra, Calif.

[73] Assignee: Parker-Hannifin Corporation, Cleveland, Ohio

[21] Appl. No.: 49,260

[22] Filed: Jun. 18, 1979

[51] Int. Cl.³ .......................... F06B 7/16; F16J 15/10
[52] U.S. Cl. .................................... 277/12; 277/152; 277/180; 277/207 R; 277/214; 52/208; 49/40; 49/466; 49/489; 49/495
[58] Field of Search ................... 49/40, 463, 466, 489, 49/495; 52/208; 277/12, 152, 153, 165, 166, 180, 182–184, 186, 205, 206 R, 207 R, 214

[56] References Cited

U.S. PATENT DOCUMENTS

| 2,091,747 | 8/1937 | Accardi | 49/489 X |
| 2,659,686 | 11/1953 | Watkins | 52/208 |
| 2,717,793 | 9/1955 | Nenzell | 277/180 X |
| 2,995,057 | 8/1961 | Nenzell | 277/152 X |
| 3,031,200 | 4/1962 | Hamer | 277/214 X |
| 3,061,321 | 10/1962 | Smith | 277/180 |
| 3,088,627 | 5/1963 | Saunders | 49/495 X |
| 3,892,417 | 7/1975 | Clayton | 277/207 R |
| 3,936,059 | 2/1976 | Jordon | 277/207 R X |
| 3,987,596 | 10/1976 | Wolf | 49/40 X |

FOREIGN PATENT DOCUMENTS 524762 8/1940 United Kingdom ...................... 49/495

*Primary Examiner*—Robert S. Ward, Jr.
*Attorney, Agent, or Firm*—James A. Baker

[57] ABSTRACT

A sealing device comprising a door or gasket of rigid material curved in one direction and straight in another, as in the form of a portion of a cylinder, and having convex and concave surfaces. Either or both such surfaces has a circumferentially continuous groove across the straight and curved portions that contains a molded in place packing of resilient material. The packing has a portion projecting from the groove and has a recess extending into the groove. The sides of the recess are either parallel to a transverse axis whose direction corresponds to the direction of travel of the mold members relative to each other when separating so that there are no undercuts in the packing material into which portions of the mold would project and prevent separation of the mold members after the molding operation without damaging the packing.

14 Claims, 14 Drawing Figures

SEALING DEVICE

BACKGROUND OF THE INVENTION

This invention relates to sealing devices of the type in which a member of rigid material, such as metal or plastic, has a circumferentially extending groove therein that receives an elastomeric packing. One sealing device of this general type is shown in U.S. Pat. No. 2,717,793. In this patent the sealing device is in the form of a flat plate with an opening therethrough and having grooves on both sides of the plate which surround the opening and contain the resilient packings. The device serves as a flat gasket to seal between flat planar faces of pipe flanges, cylinder blocks and heads, and other devices having fluid passages to be sealed. The packings are molded into the grooves and have portions projecting therefrom. Each packing has a pair of recesses extending into the respective groove with the volume of the projecting portion being substantially the same as the volume of the recesses whereby upon clamping the gasket between the members to be sealed, the projecting portions make sealing contact with the members and are deformed to substantially fill the recesses.

In the past it has been desired to utilize the sealing principles of U.S. Pat. No. 2,717,793 for access doors on various structures. In such cases, the rigid member has no opening and a packing is mounted on only one face of the door. When the doors are flat and planar, the exact configuration of the packing shown in U.S. Pat. No. 2,717,793 may be used. However, when the doors are curved in one direction, as in the case of a door in the form of a portion of a cylinder which is to be mounted on a cylindrical member, such as a cylindrical missile housing, it is not practical to mold the packing configuration of U.S. Pat. No. 2,717,793 into the curved door because portions of the recesses in the packings will have an undercut relation to the direction of travel of the one mold member relative to the other with the result that the packing will be damaged when the mold members are separated after the molding operation. To overcome this problem it has heretofore been the practice to make the doors flat, mold the packing into the door groove, and then bend the door to the desired curvature. This is a costly procedure that is difficult to accomplish properly, particularly if the door has reinforcing webs. Therefore, it is an object of this invention to provide a packing configuration that has no undercuts when molded into a groove in a door that is already curved so that the mold members may be separated after the molding operation without damaging the packing.

U.S. Pat. No. 2,995,057 illustrates a bolt with a resilient packing molded in place within a groove in a frustoconical surface of the bolt head. The packing has a recess and a projecting portion which do not form undercuts relative to the direction of travel of the mold members when separating but the patent does not disclose how a packing ring may be molded into a rigid member that is a portion of a cylinder without forming undercuts in the packing which would prevent separation of the mold members without damaging the packing.

The present invention provides a packing configuration that may be used for packings molded into a continuous, generally annular groove in either a rigid door member or a rigid gasket member that has been preformed in the form of a portion of a cylinder, that is, a form which is one cross section presents a curved outline and in another cross section normal to the first cross section presents a straight outline. This is accomplished by providing the packing with a configuration that has no undercuts relative to the direction of mold separation travel. The packing has a portion that projects from the receiving groove and includes a single recess extending into the groove for receiving the projecting portion when the latter is deformed into sealing contact with the member to be sealed. The packing further includes a surface extending from the bottom of the recess to the projecting portion. This surface in all locations about the circumference of the packing is either parallel to or inclined outwardly relative to a transverse axis of the rigid member whose direction corresponds with the direction of travel of the one mold member when it separates from a companion mold member. This packing surface forms one side of the recess in the packing. The other side of the recess is likewise so formed that it will provide no undercut which would otherwise interfere with separation of the molds.

The groove for receiving the packing may be on either the concave or convex surfaces of the curved door. In the case of a gasket there may be a groove on both the convex and concave surfaces.

DETAILED DESCRIPTION

Figure 1:
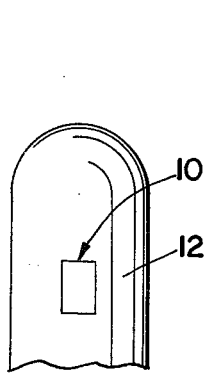
FIG. 1 is a fragmentary view of a cylindrical missile having an access door thereon.
Figure 2:
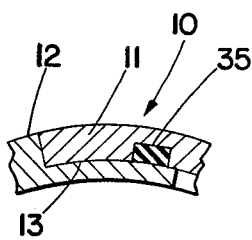
FIG. 2 is a fragmentary cross-section view showing how a resilient packing on the concave side of the access door seals against a convex surface surrounding an opening in the missile casing.
Figure 3:
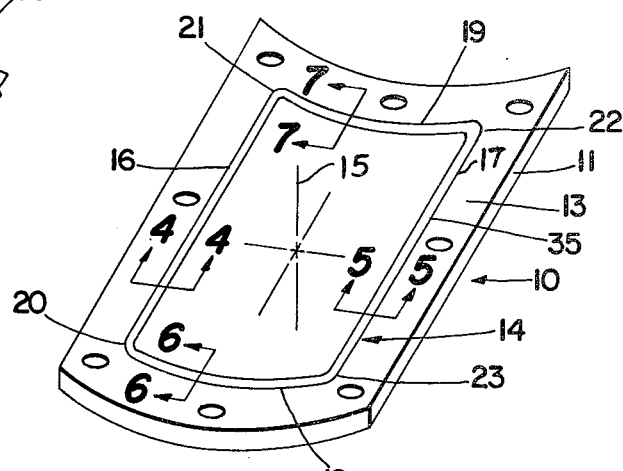
FIG. 3 is a perspective view of an access door of the present invention wherein the seal is in a concave surface of the door.

Access door 10 includes a member 11 of metal or other rigid material that is in the form of a portion of a cylinder so that it may be mounted on the cylindrical casing of a missile 12 as shown in FIGS. 1 and 2. It has an upper surface 13 that has a generally annular or circumferential groove 14 therein that forms a closed loop. As shown in FIG. 3, member 11 is curved in one direction and is straight in a direction normal to the curved direction and it has a transverse axis 15 that will pass through the longitudinal axis of the missile body or other cylindrical device upon which the door 10 is to be mounted.

The annular groove 14 includes a pair of spaced parallel sections 16 and 17 that extend straight in a direction parallel to that of the missile cylinder longitudinal axis and another pair of spaced and parallel groove sections 18 and 19 that extend on an arc whose center of curvature is on the longitudinal axis of the missile cylinder when member 10 is installed on the latter. The groove sections 16, 17 meet with groove sections 18, 19 by way of intermediate groove section portions 20, 21, 22 and 23 that are on a radius so as to be quadrants of a circle. If desired, groove sections 16, 17 could intersect groove sections 18, 19 with a right angle relationship.

Figures 4, 5:
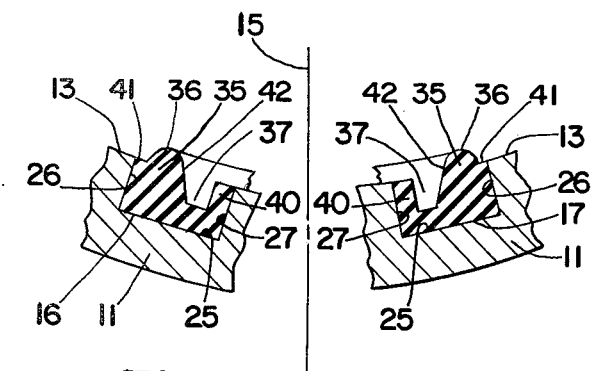
FIGS. 4 and 5 are enlarged fragmentary cross-section views along the lines 4—4 and 5—5 of FIG. 3.
Figures 6, 7:
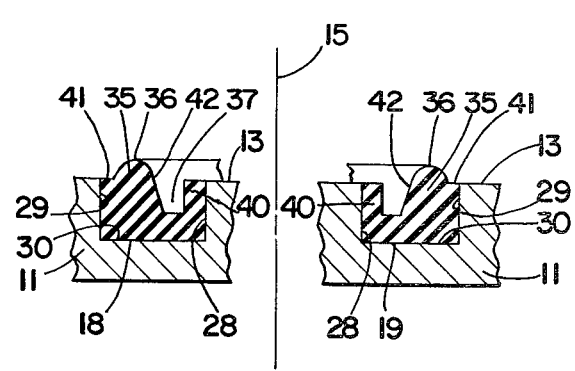
FIGS. 6 and 7 are enlarged fragmentary cross-section views along the lines 6—6 and 7—7 of FIG. 3.

As shown in FIGS. 4 and 5, grooves 16 and 17 have radially inner and outer side walls 26, 27 and a bottom wall 25. Likewise, grooves 18 and 19, as shown in FIGS. 6 and 7, have radially inner and outer side walls 28, 29 and a bottom wall 30. Bottom walls 25, as shown in FIGS. 4 and 5 are substantially parallel to upper surface 13 in the straight direction of the same. Side walls 26, 27, 28 and 29 are substantially perpendicular to the respective bottom walls 25, 30.

Molded into groove 14 so as to engage, conform and adhere, as by vulcanize binding, to groove side walls 26, 27, 28 and 29 is a packing ring 35 of resilient material such as synthetic rubber. The cross-sectional shape of such packing ring 35 is uniform throughout its circumferential extent. The packing includes a portion 36 that projects above upper surface 13 and includes a recess 37 that is below the level of surface 13. The packing includes a lip 40 whose upper face is flush with surface 13 and it includes a radially outer surface 41 that is also flush with surface 13. The packing has another surface 42 that extends from the bottom of recess 37 to projection 36 and is tangent to the radiused configuration of the latter. The volume of projecting portion 36 is substantially equal to the volume of recess 37 so that the packing will substantially fill groove 14, as shown in FIG. 2, when the door is installed.

As noted in FIGS. 4-7, packing surface 42, in cross section is substantially straight and is uniformly inclined with respect to door surface 13. However, because grooves 18 and 19 are curved and grooves 16 and 17 are straight, packing surface 42 where it extends along grooves 16 and 17 will be substantially parallel to axis line 15 while packing surfaces 42 within grooves 18 and 19 flare outwardly in an upward direction and are thus inclined with respect to axis line 15. It will also be noted that the inside surface of lip 40 is parallel with axis line 15 in FIGS. 5 and 6 and is inclined with this axis line in FIGS. 4 and 5. Packing 35 has only the one recess 37, as contrasted with two recesses in the packing of U.S. Pat. No. 2,717,793, and because this recess 37 is on the radially inner side of projection 36, no portion of the recess has an undercut relationship with the direction of axis line 15.

To manufacture access door 10, rigid member 11 is first formed as a portion of a cylinder and then groove 14 is cut in upper surface 13. The member 11 is then inserted between a pair of mold members 50, 51 as shown in FIGS. 8-11. Upper mold member 51 has formed thereon at 52 a configuration that will mold and shape the upper surfaces of the packing while companion mold member 50 is shaped to seat and hold rigid member 11 for the molding operation. Suitable dowel pins 54 are provided for guiding mold member 51 in a vertical straight line motion relative to companion member 50 during closing and opening movements of the mold members. This straight line motion corresponds in direction to axis line 15 of member 11 and this axis line is shown in FIGS. 8-11 to illustrate the direction of travel of the mold members relative to each other.

Figure 8:
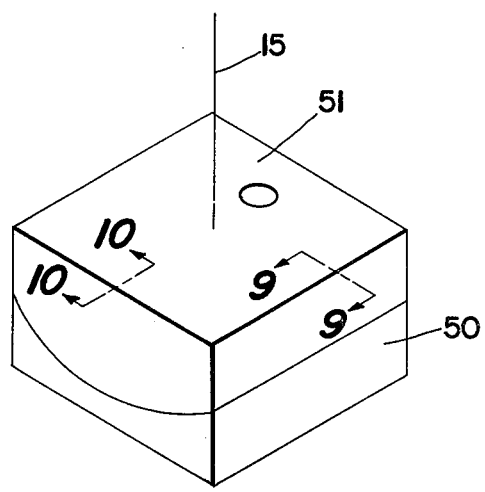
FIG. 8 is a perspective view of mold members for molding the packing onto the access door.
Figure 9:
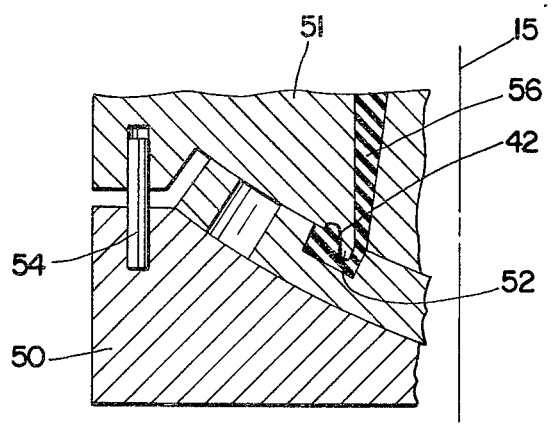
FIG. 9 is a fragmentary cross section of the door on the line 4—4 of FIG. 3 when it is received by the mold members for molding of the packing into place by either injection or transfer molding.
Figure 11:
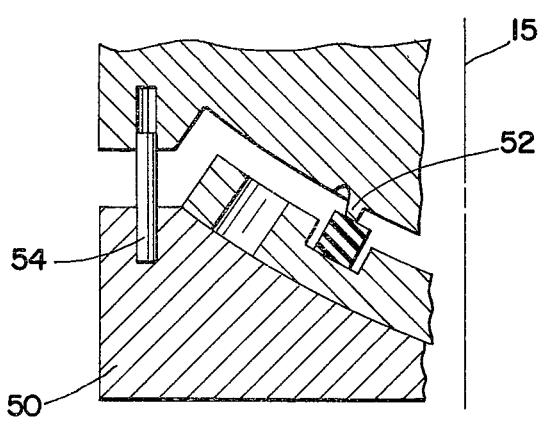
FIG. 11 is a fragmentary cross-section view of mold members receiving the access door for molding the packing by the compression method.

FIG. 9, which is a fragmentary enlarged view along the lines 9—9 of FIG. 8, shows how the molds may be arranged for insertion of the packing material through a sprue 56 by either injection or transfer molding techniques, while FIG. 11 shows how the mold members may be arranged for compression molding.

As shown in the mold portions illustrated in FIG. 9, surface portion 42 of the packing corresponds with the surface portion 42 shown in FIG. 4 and is substantially parallel with line 15 so that there is no undercut portion in this portion of the packing in groove portion 16 and the upper mold member 51 may be readily removed by moving it in the direction of line 15 without damaging packing 35. The same is true with respect to the portion of packing 35 within groove 17, which is illustrated in FIG. 5.

Figure 10:
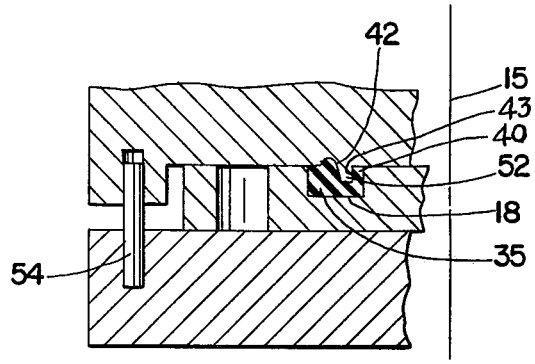
FIG. 10 is a fragmentary cross section view like that of FIG. 9 except on the line 6—6 of FIG. 3.

FIG. 10, which is a fragmentary section view through mold members 50, 51 along the lines 10—10 of FIG. 8 shows the molding of the packing in groove 18. In this case the packing surface portion 42 is inclined upwardly and radially outwardly with respect to line 15 and the radially outer surface 43 of lip 40 is parallel with line 15 so that again there are no undercut portions in packing 40 within groove 18 so that mold member 51 may be separated from mold member 50 in the direction of line 15 without damaging of packing 35. The same is true of the portion of packing 35 molded into groove sections 19.

In the radiused zones 20-24 the groove 14 and packing 35 undergo a transition from the straight line direction in groove portions 16 and 17 to the curved direction of groove portions 18, 19. Likewise, the attitude of packing surface 42 gradually changes from the parallel relationship to axis line 15, as shown in FIGS. 4 and 5, to the maximum inclined relationship shown in FIGS. 6 and 7.

Figure 12:
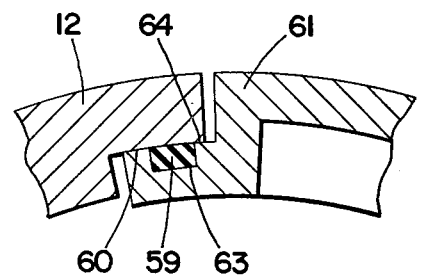
FIG. 12 is a view similar to FIG. 2, but showing the packing on the convex side of a door to seal against a concave surface of the missile casing.
Figure 13:
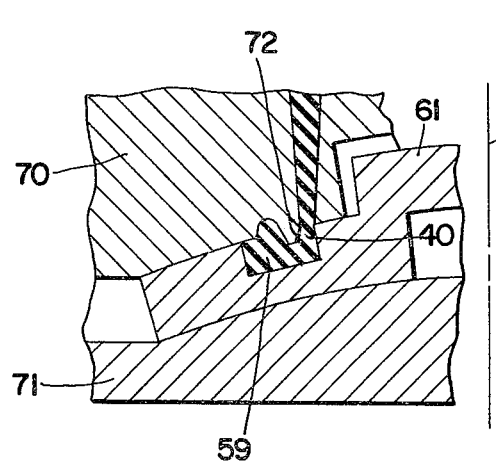
FIG. 13 is a fragmentary view along the lines 9—9 of FIG. 8 when the mold is adapted for molding the packing on the convex side of a curved door.

As shown in FIG. 12, missile casing 12 may be formed with a concave cylindrical surface 60 against which packing 59 is to seal. In this case door 61 has groove 63 formed in a convex surface 64 thereof to receive packing 59. To mold the packing, the upper and lower mold members 70, 71 are formed as shown in FIG. 13 in a plane of cross section corresponding to that of FIG. 9. In a plane of cross section corresponding to FIG. 10 the mold members 70, 71 and door member 61 will appear as the corresponding parts of FIG. 10. In this case, the inner surface 72 of packing lip 40 is either slightly radially outwardly inclined as it progresses toward the groove bottom, as shown, or is substantially parallel with axis 15 in the cross section of FIG. 13 and will be radially outwardly inclined to such axis in a cross section corresponding to that of FIG. 10 so that no undercut will be formed in the lip whereby mold member 70 may be removed in the direction of axis 15 without damaging packing 59.

Figure 14:
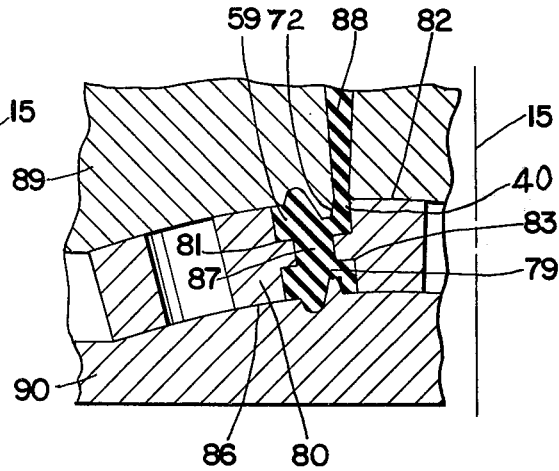
FIG. 14 is a fragmentary view along the lines 9—9 of FIG. 8 when the mold is adapted for molding a packing on both the concave and convex sides of a rigid gasket member.

FIG. 14 shows how a cylindrically curved rigid gasket member 80 may have packings 59 molded into a groove 81 in convex surface 82 thereof and another packing 79 in a groove 83 in concave surface 86 of member 80. Grooves 81, 83 are connected by a series of holes 87 so that some of the elastomeric material forced through sprue 88 of molded member 89 into groove 81 will pass through holes 87 into groove 83. In this case packing 59 of FIG. 14 conforms in cross section outline to packing 59 of FIG. 13 while packing 79 confirms in cross section outline with packing 35 of FIGS. 4–7. In neither case is there an undercut portion relative to axis 15 so that after molding, mold member 89 may be removed in the direction of axis 15 without damage to packing 59 and member 80 removed from mold member 90 in the same direction without damage to packing 79.

I claim:

1. A sealing device comprising a member of rigid material having an upper surface which in a first plane of cross section through said surface is curved and which in a second plane of cross section through said surface normal to said first plane is straight, said member having a transverse central axis, said upper surface having a circumferentially continuous groove therein comprising a first pair of spaced apart groove sections extending generally parallel to said first plane and a second pair of spaced apart groove sections extending generally parallel to the second plane and joining with said first groove sections, an annular packing of resilient material within said groove and having a portion projecting from said groove upwardly of said upper surface and also having a recess below said upper surface, said packing having a surface extending upwardly from the lower end of said recess to said projection, and said packing surface in any plane transverse of the packing being in a line such that no point on said line that is upwardly of another point on said line is radially inward of said another point.

2. The device of claim 1 in which the side walls of said second groove sections are substantially parallel to said axis and the side walls of said first groove sections are inclined radially inwardly as they progress upwardly of the groove bottom.

3. The device of claim 1 in which said line is substantially parallel to said axis in said second groove sections.

4. The device of claim 3 in which said line is inclined radially outwardly as it progresses upwardly of the recess bottom in said first groove sections.

5. The device of claim 4 in which said packing is of uniform cross sectional configuration throughout its circumferential extent.

6. The device of claim 1 in which said projection is radially outward of the recess.

7. The device of claim 1 in which said first groove sections are joined to said second groove sections by curved groove sections.

8. The device of claim 7 in which said line is substantially parallel to said axis in said second groove sections and is inclined upwardly away from said axis in said first groove sections, and said line gradually changes from said parallel to said inclined relationship with said axis in said curved sections.

9. The device of claim 1 in which said packing is molded into said groove.

10. The device of claim 1 in which said groove is rectangular in cross section, said packing has an upper surface extending from said projection to the radially outer side wall of the groove and is substantially flush with the upper surface of said member adjacent said outer side wall of the groove, and said packing has another upper surface extending from said recess to said inner side wall of the groove and which is substantially flush with the upper surface of said member.

11. The device of claim 1 in which said upper surface in said first plane of cross section is concave.

12. The device of claim 1 in which said upper surface in said first plane of cross section is convex.

13. The device of claim 1 in which said rigid member has a lower surface which in said first plane of cross section is curved and which in said second plane is straight, said lower surface having a circumferentially continuous second groove therein comprising a third pair of spaced apart groove sections extending generally parallel to said first plane and a fourth pair of spaced apart groove sections extending generally parallel to the second plane and joining with said third groove sections, a second annular packing in said second groove and having a portion projecting from said second groove downwardly of said lower surface, said second packing also having a second recess above said lower surface, said second recess having radially inner and outer side walls, said radially outer side wall extending to said projection, and neither of said side walls having radially extending undercuts therein.

14. A sealing device comprising a member of rigid material having a surface which in at least one plane of cross section through said surface is curved, said member having a transverse central axis, said surface having a circumferentially continuous groove therein comprising a first pair of spaced apart groove sections extending generally parallel to said first plane and a second pair of spaced apart groove sections extending generally transverse to said first pair of groove sections and joining with said first groove sections, an annular packing of resilient material within said groove and having a portion projecting from said groove outwardly of said surface and also having a recess inwardly of said groove, said packing having a surface extending from the bottom of said recess to said projection, and said packing surface in any plane transverse of the packing being in a line such that no point on said line that is between the recess bottom and any other point on said line is radially inward of said other point.

* * * * *